United States Patent [19]

Tsukuda et al.

[11] Patent Number: 5,301,190
[45] Date of Patent: Apr. 5, 1994

[54] COMMUNICATION DEVICE HAVING RELAYING AND SWITCHING FUNCTION

[75] Inventors: Hiroyuki Tsukuda, Kawasaki; Yoshiya Iribe, Yokohama, both of Japan

[73] Assignee: Fujitsu Limited, Kawasaki, Japan

[21] Appl. No.: 847,011

[22] PCT Filed: Aug. 6, 1991

[86] PCT No.: PCT/JP91/01045
§ 371 Date: Apr. 6, 1992
§ 102(e) Date: Apr. 6, 1992

[87] PCT Pub. No.: WO92/03023
PCT Pub. Date: Feb. 20, 1992

[30] Foreign Application Priority Data

Aug. 6, 1990 [JP] Japan .................. 2-207836

[51] Int. Cl.$^5$ .............................................. H04J 3/22
[52] U.S. Cl. .................................. 370/66; 370/68; 370/84
[58] Field of Search .............. 370/84, 58.1, 53, 66, 370/100.1, 79, 102

[56] References Cited

U.S. PATENT DOCUMENTS

| | | | |
|---|---|---|---|
| 4,641,303 | 2/1987 | Vogl | 370/84 |
| 4,672,662 | 6/1987 | Nishino et al. | 370/58.1 |
| 4,805,165 | 2/1989 | Kawamura et al. | 370/84 |
| 4,825,436 | 4/1989 | Kobayashi et al. | 370/84 |

OTHER PUBLICATIONS

Patent Abstracts of Japan, vol. 10, (E-1038) & JP-A-2 298 132 (Mitsubishi).
Patent Abstracts of Japan, vol. 11, (E-821) & JP-A-1 152 894 (NEC).
Electronic Switching, "Studies in Telecommunications"; vol. 2, Elsevier Science Publ., Amsterdam, NL; vol. 2, 1984; pp. 161–164.

Primary Examiner—Benedict V. Safourek
Assistant Examiner—Ajit Patel
Attorney, Agent, or Firm—Staas & Halsey

[57] ABSTRACT

In a communication device having a transmission device connected to first and second transmission paths, and an exchange connected to the transmission device, the transmission device includes a codec and a switching part. When a speech signal received from the first transmission path terminates at a terminal accommodated in the exchange, the speech signal having a low bit rate is converted, by the codec, into a bit rate which can be processed by the exchange, and then sent to the exchange. Meanwhile, when the speech signal received from the first transmission path is relayed to the second transmission path, the speech signal having the low bit rate is sent to the second transmission path via the switching part without passing it through the codec while the bit rate of the speech signal is maintained.

14 Claims, 7 Drawing Sheets

COMMUNICATION DEVICE HAVING RELAYING AND SWITCHING FUNCTION

TECHNICAL FIELD

The present invention relates to a communication system which compresses signals, such as speech signals and multiplexes these signals with each other to send these signals to a high-bit-rate digital line in the form of a multiplexed signal. More specifically, the present invention is concerned with a communication device having a function of terminating a received call at a terminal, or relaying it to the high-bit-rate digital line.

BACKGROUND ART

Recently, there has been in practical use a communication system which sends to a high-bit-rate digital line a signal obtained by compressing and multiplexing speech signals. Conventionally, speech signals are multiplexed at a bit rate of 64 Kbps, and a multiplexed signal thus obtained is sent to a high-bit-rate digital line. Further, recently there has also been provided a system in which speech signals have been multiplexed at a bit rate of 32 Kbps.

Figure 1:
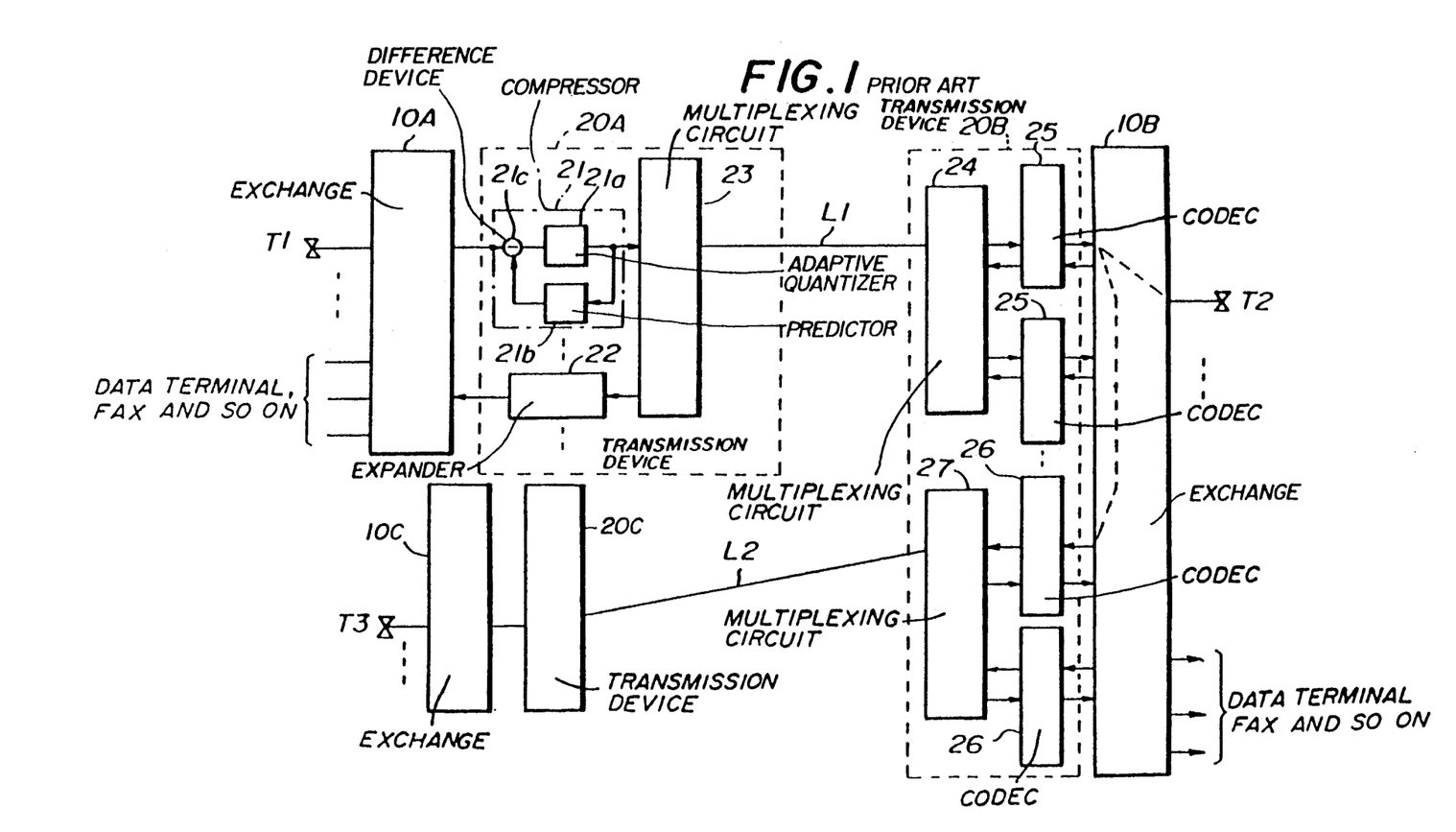
FIG. 1 is a block diagram of a communication system using conventional communication devices.

FIG. 1 shows a conventional communication system having a function of compressing and multiplexing speech signals in order to send these signals to a high-bit-rate digital line. The communication system shown in FIG. 1 functions as a WAN (Wide Area Network), and comprises exchanges 10A, 10B and 10C, such as PBXs (Private Branch Exchanges), transmission devices 20A, 20B and 20C, and transmission paths L1 and L2 which are high-bit-rate digital lines. The transmission path L1 connects the transmission devices 20A and 20B to each other, and the transmission line L2 connects the transmission devices 20B and 20C to each other.

Each of the exchanges 10A, 10B and 10C accommodates terminals T1, T2 and T3, such as telephone sets, and terminals other than telephone sets, such as data terminals and facsimile machines A circuit of a communication path system of each of the exchanges 10A, 10B and 10C switches 64 Kbps signals. Hence, each of the exchanges 10A, 10B and 10C has a PCM (Pulse Code Modlation) converter which converts analog signals from the terminals T1, T2 and T3 into a PCM speech signal having a bit rate of 64 Kbps and executes the reverse operation. It may be possible to provide the above PCM converter for each analog terminal.

The transmission device 20A connected to the exchange 10A comprises a compressor 21, an expander 22 and a multiplexing circuit 23. The compressor 21 converts the 64 Kbps PCM speech signal into an ADPCM (Adaptive Differential Pulse Code Modulation) signal having a bit rate of 32 Kbps. As shown, the compressor 21 is comprised of an adaptive quantizer 21a, a predictor 21b and a difference device 21c. Generally, a plurality of compressors 21 are provided. The multiplexing circuit 23 multiplexes the 32 Kbps ADPCM signals with other digital signals (image signals and data signals), and sends a multiplexed signal to the transmission path L1. Further, the multiplexing circuit 23 separates a plurality of digital signals from a multiplexed signal received from the transmission line L1. The expander 22 demodulates the received 32 Kbps ADPCM signal to generate a 64 Kbps PCM speech signal. The demodulated PCM speech signal is sent to the exchange 10A. The compressor 21 and the expander 22 form a speech codec. The transmission device 20C and the exchange 10C connected thereto are respectively configured in the same manner as the above transmission device 20A and the exchange 10A.

The transmission device 20B comprises a multiplexing circuit 24 connected to the transmission line L1, and a speech codec 25 connected thereto. Further, the transmission device 20B comprises a multiplexing circuit 27 connected to the transmission line L2, and a speech codec 26 connected thereto. Each of the speech codecs 25 and 26 has the functions of both the compressor 21 and the expander 22.

It will now be assumed that the terminal T1 accommodated in the exchange 10A generates a call requesting to communicate with the terminal accommodated in the exchange 10B, a speech signal from the terminal T1 being converted into a 64 Kbps PCM speech signal in the exchange 10A, which is then converted into a 32 Kbps ADPCM speech signal by the compressor 21 of the transmission device 20A. The ADPCM signal is multiplexed with other signals, and then sent to the transmission path L1. The multiplexing device of the transmission device 20B demultiplexes the received multiplexed signal to generate separate signals. The codec 25 converts the 32 Kbps ADPCM signal into the 64 Kbps PCM speech signal. The exchange 10B discriminates a dial signal in a control channel received via the multiplexing device 24, and recognizes that the call from the terminal T1 should terminate at the terminal T2. The exchange 10B specifies a channel coupling the terminals T1 and T2 to each other, and then they become connected to each other.

In a case where the terminal T1 calls the terminal T3 accommodated in the exchange 10C, the exchange 10B analyzes a dial signal from the terminal T1 and recognizes that the call should be sent to the exchange 10C. In this case, the exchange 10C sets a channel connecting the transmission paths L1 and L2 to each other. A signal received from the transmission path L1 via the multiplexing circuit 24 and the speech codec 25 is sent to the transmission path L2 via the exchange 10B, the speech codec 26 and the multiplexing circuit 27. During this time, the 64 Kbps PCM speech signal from the exchange 10B is converted into the 32 Kbps ADPCM signal by the speech codec 26. Then, the speech signal from the terminal T1 is supplied to the terminal via the transmission device 20C and the exchange 10C. A speech signal from the terminal T3 is transmitted to the terminal T1 in a route the reverse of the above route As described above, in the communication system, the compression and expansion processes are repeatedly carried out. The above bit-rate conversion (64 Kbps→32 Kbps) does not cause a deterioration of speech in terms of the principle. The compression and expansion process using the ADPCM is particularly called transcoding. That is, on the transmission side, the next sampling value is predicted from a sampling value, and only the difference between the predicted value and the real value is quantized and transmitted. On the receiving side, a predicted value is added to the transmitted residual signal to reproduce the real value. On the transmission side, the quantizing step is changed so that the difference between the predicted value and the real value becomes smaller. By using the above transcoding technique, the quality of the 32 Kbps speech signal on the transmission path L1 is theoretically the same as that of the 32 Kbps speech signal on the transmission path L2 even when the above compression and expansion processes are repeatedly carried out. As a result, there is no deterioration of speech even when the speech signal is repeatedly relayed and transmitted.

However, a problem will occur when the transmission paths L1 and L2 transmit further compressed signals, such as 16 Kbps or 8 Kbps signals. Generally, in a speech signal up to a low bit rate lower than or equal to 16 Kbps, it is very difficult to apply the transcoding technique used in the 32 Kbps ADPCM. That is, the quality of speech will greatly deteriorate if the low-bit-rate signals having a bit rate lower than or equal to 16 Kbps are processed by the transcoding technique.

Figure 2:
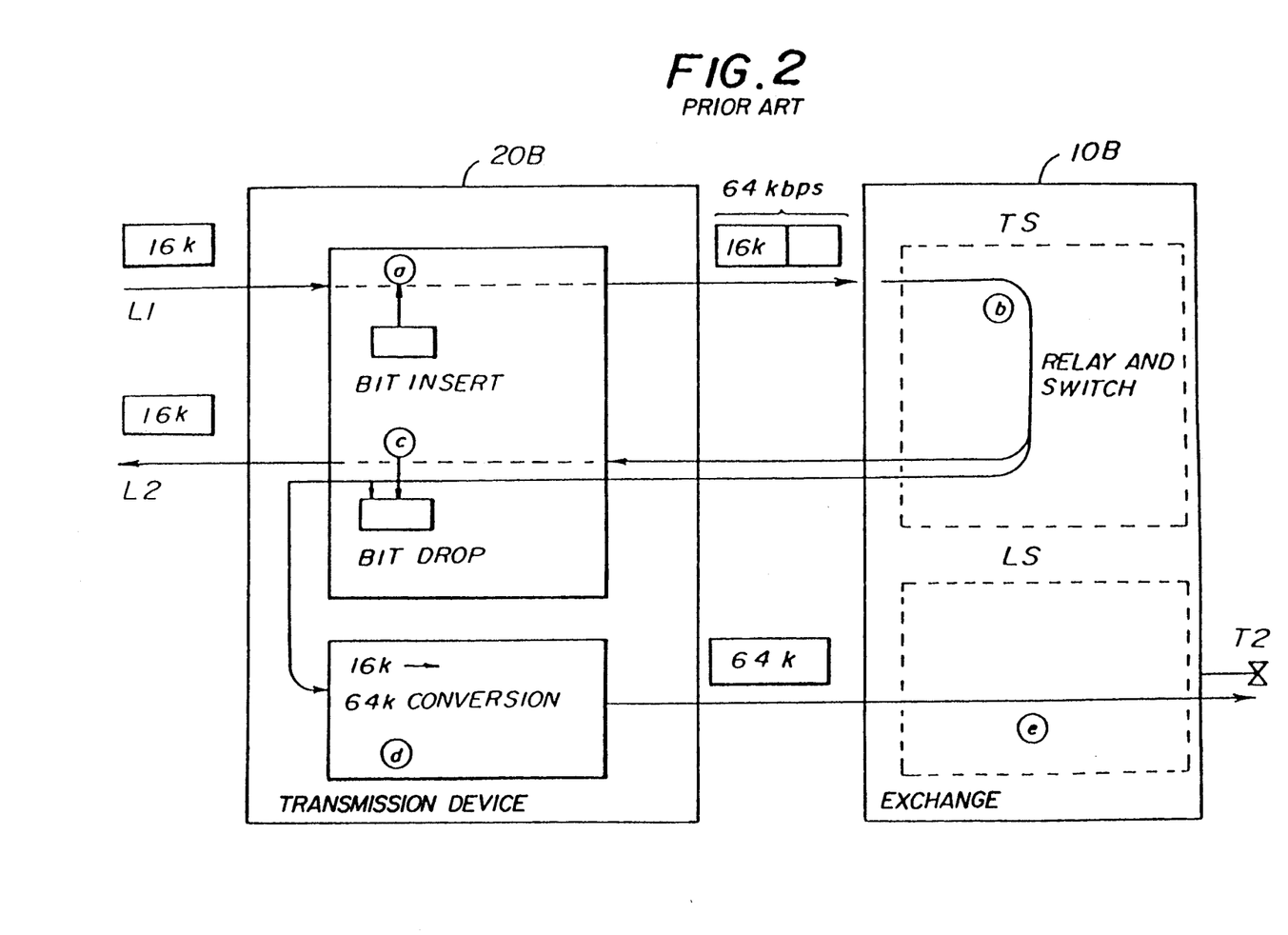
FIG. 2 is a block diagram of another conventional communication device intended to eliminate disadvantages of the conventional communication devices shown in FIG. 1.

In a conventional technique, a process shown in FIG. 2 is used in order to transmit the speech signal at a low bit rate lower than or equal to 16 Kbps. In the transmission device 20B, surplus bits (dummy bits) amounting to 48 Kbps (56 Kbps) are added to the 16 Kbps (8 Kbps) speech signal received from the transmission path L1, so that a 64 Kbps signal is generated (ⓐ shown in FIG. 2). The 64 Kbps signal containing the dummy bits is switched via a time switch TS without being changed, and sent to the transmission device 20B (ⓑ in FIG. 2). The transmission device 20B removes the dummy bits from the received 64 Kbps signal and reproduces the 16 Kbps (8 Kbps) speech signal. When the 16 Kbps (8 Kbps) signal should be only switched for relay, it is sent to an objective path (transmission path L2 in this case) (ⓒ in FIG. 2). On the other hand, when the 16 Kbps (8 Kbps) signal is a call requested to terminate at the terminal T2, the 16 Kbps (8 Kbps) speech signal is output to the speech codec having the 16 Kbps→64 Kbps conversion function in the transmission device 20B (ⓒ in FIG. 2). The codec converts only the 16 Kbps speech signal into a 64 Kbps speech signal, and outputs the 64 Kbps speech signal to a line switch LS in the exchange 10B (ⓓ in FIG. 2). The line switch LS outputs the 64 Kbps speech signal to the terminal T2.

However, the structure shown in FIG. 2 has a disadvantage in that the efficiency of processing is poor and it takes a long time to process the signals because irrespective of whether or not each call should be relayed to the transmission path L2 or terminate at a terminal accommodated in the exchange 10B, the dummy bits are added to all input speech signals and removed therefrom and thereafter the 16 Kbps (8 Kbps) speech signals are converted into the 64 Kbps signals which can be processed by the exchange 10B.

SUMMARY OF THE INVENTION

An object of the present invention is to provide a communication device capable of efficiently executing the relay process and the terminating process within a short time without deteriorating the quality of speech in a relaying and switching system having a transmission path via which a low-bit-rate compressed speech signal is transmitted.

The above object of the present invention is achieved by a communication device including a transmission device connected to first and second transmission paths, and an exchange connected to the transmission device, the communication device being configured as follows. The exchange comprises: first control means for determining whether an input signal which has a first bit rate and is received by the transmission device via the first transmission path is a first signal which should be one of a plurality of terminals connected to the exchange or a second signal which should be relayed to the second transmission path via the transmission device; and first switching means for selectively connecting the transmission device and the terminals and transferring a signal having a second bit rate between them. The transmission device comprises: second switching means for selectively connecting the first and second transmission paths and the exchange and transferring a signal having the first bit rate between them; converting means for converting the input signal having the first bit rate into a signal having the second bit rate which is output to the exchange and for converting a signal which has the second bit rate and is received via the exchange into a signal having the first bit rate which is output to the second switching means; and second control means for controlling, when the first control means determines that the input signal is the second signal, the second switching means so that the input signal is output to the exchange via the conversion means and for controlling, when the first control means determines that the input signal is the first signal, the second switching means so that the input signal is output to the second transmission path without changing a bit rate thereof.

The above object of the present invention is also achieved by a communication device including a transmission device connected to first and second transmission paths, and an exchange connected to the transmission device, the communication device being configured as follows. The transmission device comprises: codec means for converting an input signal which has a first bit rate and is received via the first transmission path into a first converted input signal having a second bit rate and for converting an output signal which has the second bit rate and is received from the exchange into the first converted output signal having the first bit rate; dummy bit inserting and dropping means for adding dummy bits to the input signal so that a second converted input signal having the second bit rate is generated and for removing the dummy bits from a dummy-bit added output signal received from the exchange so that the second converted output signal having the first bit rate is generated; and selecting means for selecting either the codec means or the dummy bit inserting and dropping means in accordance with a control signal.

The exchange comprises: first control means for determining whether the input signal which has the first bit rate and is received by the transmission device via the first transmission path is a first signal which should terminate at one of a plurality of terminals connected to the exchange or a second signal which should be relayed to the second transmission path; and switching means for selectively connecting the transmission device and the terminals to transfer signals respectively having the second bit rate.

Further, the transmission device comprises second means for making the select means select the codec means when the first control means determines that the input signal is the first signal and for making the select means select the dummy bit inserting and dropping means when the first control means determines that the input signal is the second signal.

BEST MODE OF CARRYING OUT THE INVENTION

Figure 3:
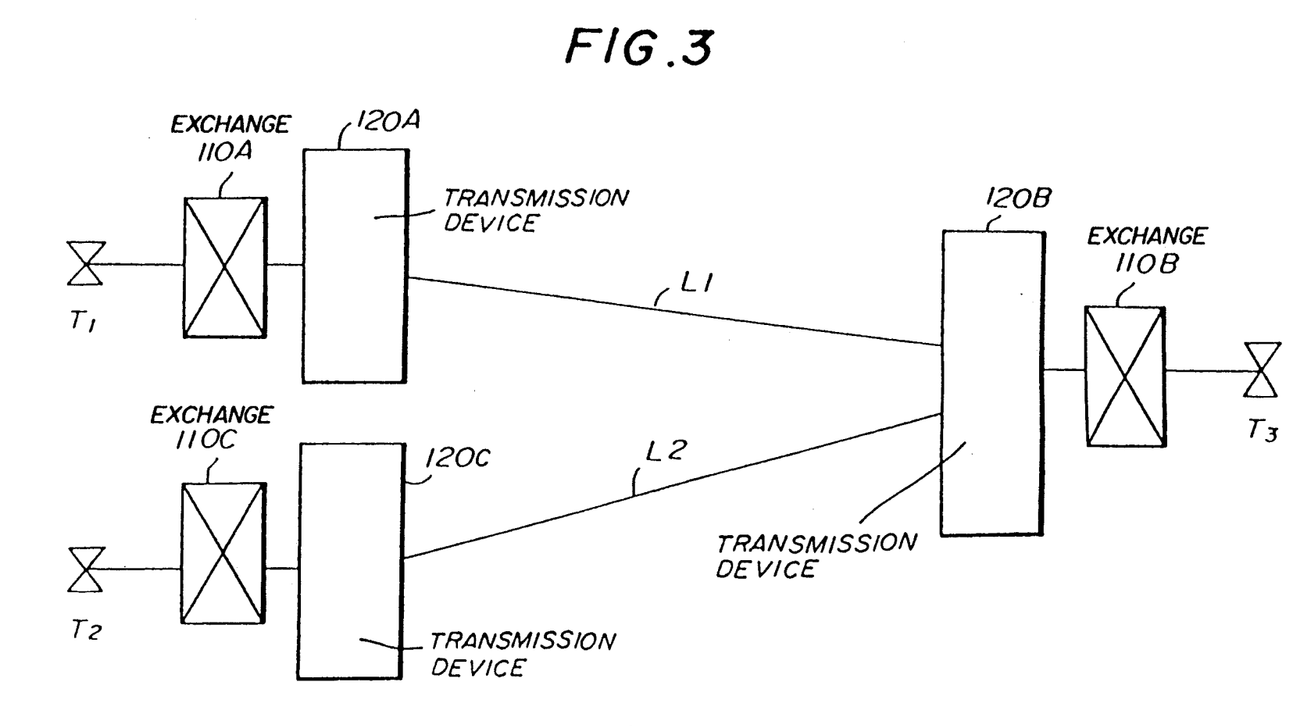
FIG. 3 is a block diagram of a communication system in which communication devices of the present invention are used.

FIG. 3 is a block diagram of a communication system in which the present invention is used. The communication system shown in FIG. 3 comprises exchanges 110A, 110B and 110C, and transmission devices 120A, 120B and 120C. Each of the exchanges 110A, 110B and 110C operates at a bit rate of 64 Kbps. Each of the transmission devices 120A, 120B and 120C comprises a speech codec which compresses a 64 Kbps speech signal into a signal having a bit rate lower than or equal to 16 Kbps and which converts a speech signal having a bit rate lower than or equal to. 16 Kbps into a 64 Kbps speech signal, and a multiplexing circuit which generates a multiplexed signal by multiplixing signals, such as 16 Kbps speech signals, and which generates signals, such as 16 Kbps speech signals, by demultiplexing a multiplexed signal. As will be described later, the transmission device 120B has a relaying and switching function. The transmission paths L1 and L2 transmit speech signals and other signals respectively having bit rates lower than or equal to 16 Kbps. It will now be assumed that hereinafter, the low bit rate is equal to 16 Kbps.

Figure 4:
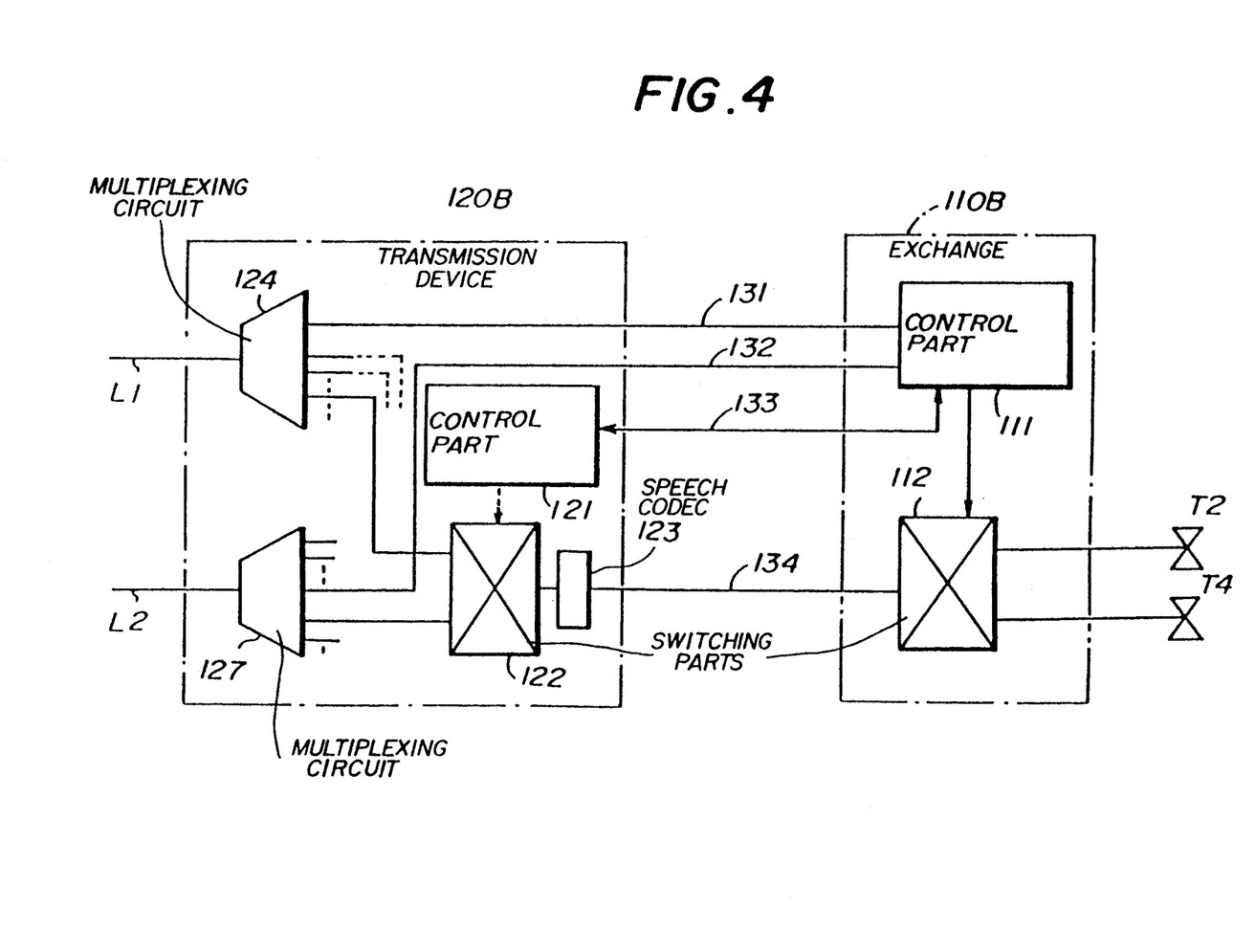
FIG. 4 is a block diagram of a communication device according to a first embodiment of the present invention.

FIG. 4 shows the exchange 110B and the transmission device 120B shown in FIG. 3 in more detail. The exchange 110B comprises a control part 111 and a switching part 112. The exchange 110B executes a switching operation under the control of the control part 111. The transmission device 120B comprises a control part 121, a switching part 122, a speech codec 123, and multiplexing circuits 124 and 127. The multiplexing circuit 124 has the function of separating 16 Kbps speech signals and other signals from a multiplexed signal received via the transmission path L1 and outputting these signals to the switching part 122, and the function of multiplexing 16 Kbps speech signals and other signals with each other and sending a multiplexed signal to the transmission path L1. The multiplexing circuit 127 separates 16 Kbps speech signals and other signals from a multiplexed signal received via the transmission path L2 and outputting these signals to the switching part 122, and the function of multiplexing 16 Kbps speech signals and other signals with each other and sending a multiplexed signal to the transmission path L2. The speech codec 123 has the function of converting only the 16 Kbps speech signals from the switching part 122 into a 64 Kbps PCM speech signal and sending it to the exchange 110B. The speech codec 123 has the function of converting a 64 Kbps PCM signal from the exchange 110B into 16 Kbps speech signals and sending these signals to the switching part 122. The switching part 122 executes a switching operation under the control of the control part 121, as will be described later. For example, when a call received via the transmission path L1 should be sent to the transmission L2 by the relaying and switching operation, the exchange 122 relays the signal from the transmission path L1 to the transmission path L2. When the switching part 122 comprises a time switch, the signal is relayed by specifying a time slot (channel) on an input highway and a time slot (channel) on an output highway. The multiplexing circuit 124 and the control part 111 of the exchange 110B are connected to each other via a control line 131. Similarly, the multiplexing circuit 127 and the control part 111 are connected to each other via a control line 132. The multiplexing circuit 124 sends to the transmission line L1 a variety of control information from the control part 111 corresponding to D-channel information set forth in the CCITT Recommendations and receives such control information from the transmission line L1. Similarly, the multiplexing circuit 127 sends a variety of control information to the transmission line L2 and receives such control information from the transmission line L2. The control part 121 of the transmission device 120B and the control part 111 of the exchange 110B are connected to each other via a control line 133. The speech codec 123 and the switching part 112 of the exchange 110B are connected to each other via a signal line 134.

Figure 5:
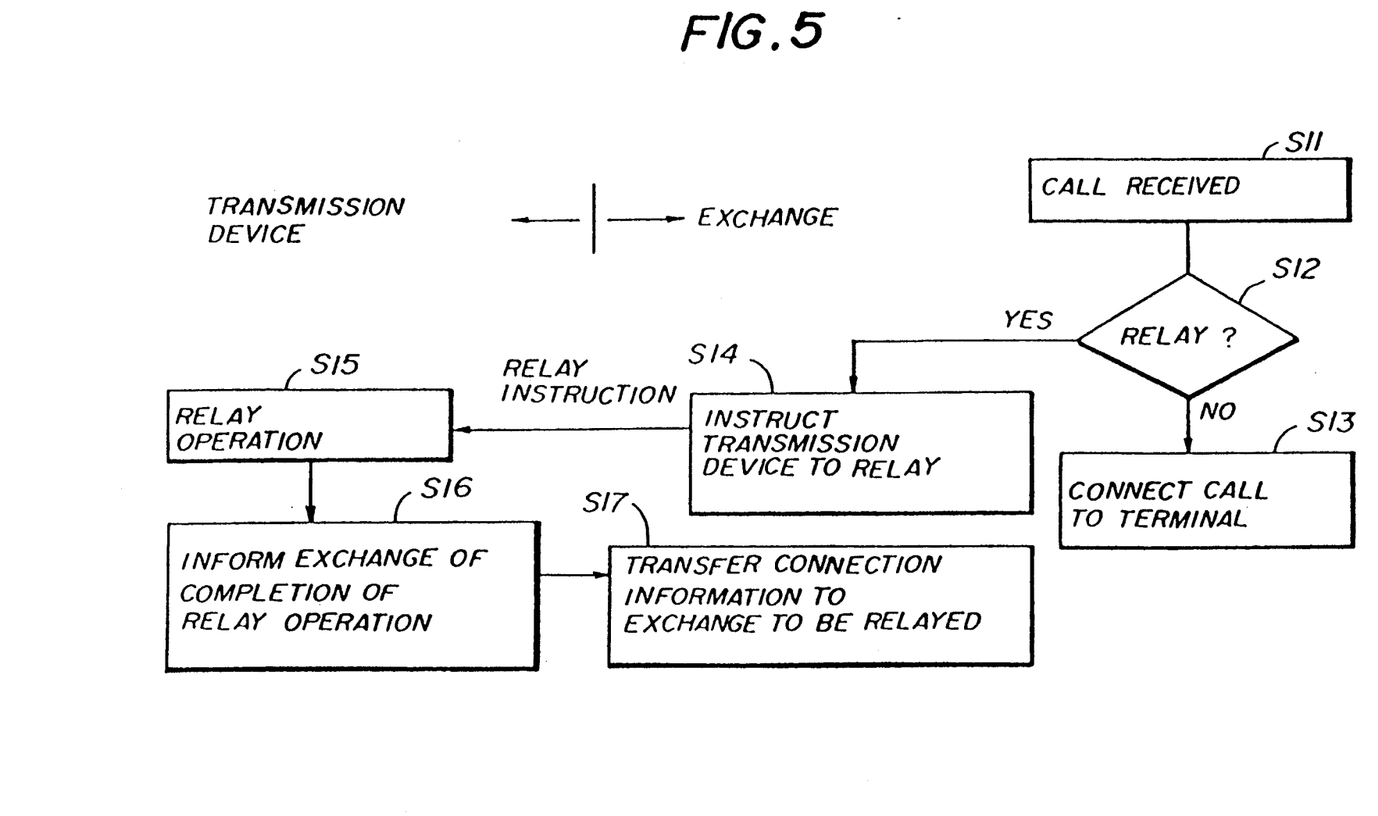
FIG. 5 is a flowchart of the operation of the communication device shown in FIG. 4.

A description will now be given, with reference to an operation flowchart of FIG. 5, of the operation of the relaying and switching device shown in FIG. 4. Assuming that the terminal T1 shown in FIG. 4 generates a call, the control part 111 of the exchange 110B receives the call from the exchange 110A via the multiplexing circuit 124 and the control line 131 (step S11). The control part 111 of the exchange 110B determines, from discrimination information, such as a dial number, whether the call should terminate at a terminal accommodated by the exchange 110B (terminal T2, for example) or should be switched and relayed to the transmission path L2 (step S12). When it is determined that the received call should terminate at a terminal accommodated by the exchange 110B, the controller 111 of the exchange 110B sends the control part 121 of the transmission apparatus 120B an instruction for connecting the channel carrying the call and an idle channel in the speech codec 123 to each other via the switching part 122. The speech codec 123 converts the 16 Kbps speech signals into the 64 Kbps speech signal, and outputs the 64 Kbps speech signal to the switching part 112 of the exchange 110 via the signal line 134. The switching part 112 outputs the 64 Kbps speech signal from the speech codec 123 to the terminal T2 under the control of the controller 111.

When it is determined, in step S12, that the call received in step S12 should be relayed to the transmission path L2, the control part 111 sends relay information (which shows that the called terminal is located on the transmission path L2) to the control part 121 of the transmission device 120B via the control line 133 (step S14). The control part 121 receives the relay information and connects the channel carrying the call on the side of the multiplexing circuit 124 and an idle channel on the side of the multiplexing circuit 127 (step S15). After the connection has been completely made, the control part 121 informs the control part 111 of the exchange 110B of the completion of the relay operation (step S16). In response to this completion of the relay operation, the control part 111 sends control information (connection information) about the call from the terminal T1 to the transmission path L2 via the control line 132 and the multiplexing circuit 127. The 16 Kbps speech signal from the terminal T1 is relayed via the switching part 122 without being changed.

The switching part 122 has the function of switching all the data channels of the transmission paths L1 and L2. In this regard, the switching part 122 is similar to the switching part 112 of the exchange 110B. However, the switching part 112 has various service functions and the dial recognition function, while the switching part 122 of the transmission device 120B does not need such functions and has a small size. Normally, the transmission path L1 is coupled to the exchange 110B via the speech codec 123 as long as the relay instruction from the exchange 110B has not been received.

As described above, according to the first embodiment of the present invention, a call which should be relayed is processed by the transmission device 120B without the exchange 110B. That is, it is not necessary to repeatedly carry our the compression and expansion. Hence, it becomes possible to efficiently transmit the speech signals via a low-bit-rate transmission path at a high speed without deteriorating the quality of speech.

Figure 6:
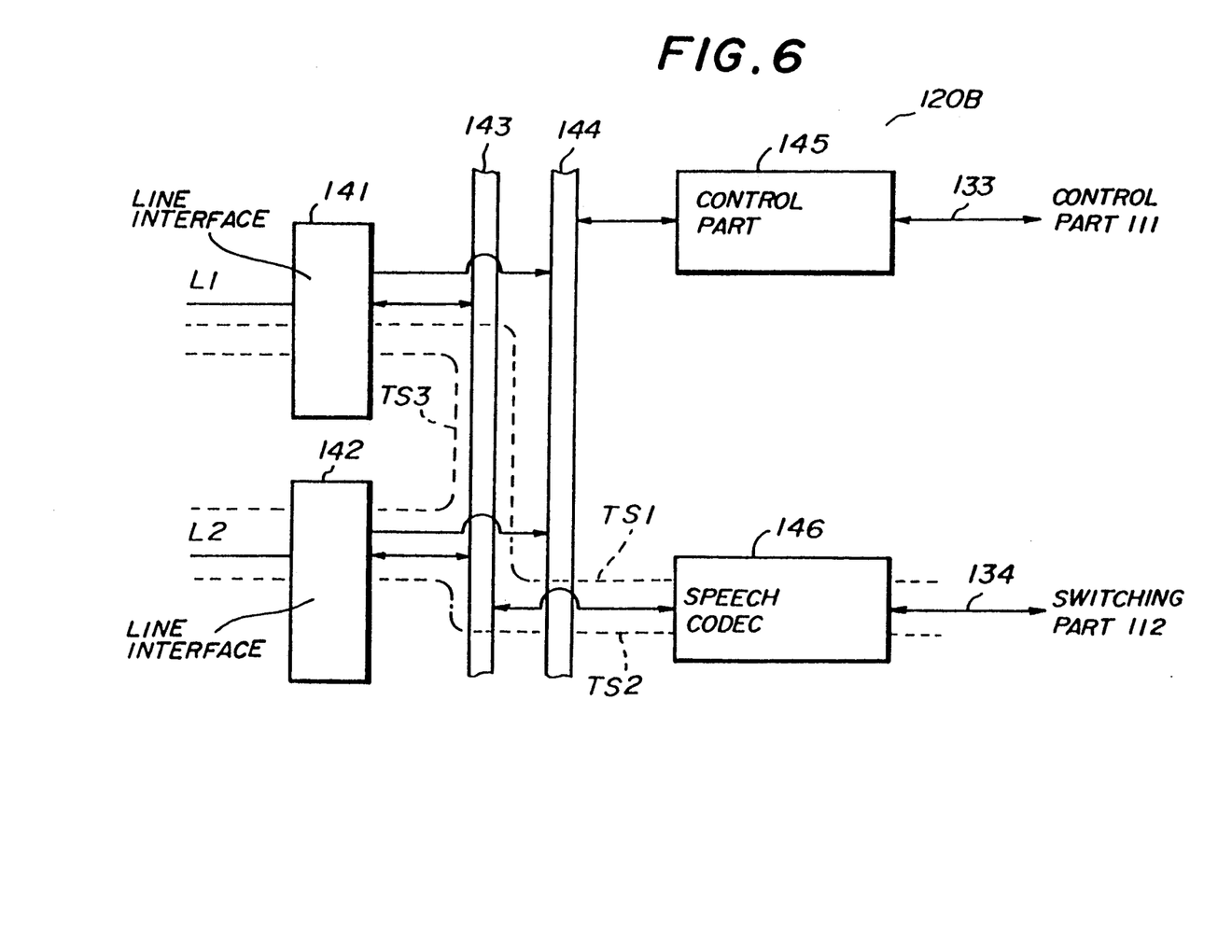
FIG. 6 is a block diagram of a communication device different from the communication device shown in FIG. 4.

FIG. 6 shows another structure of the transmission device 120B. Instead of the time switch, the transmission device 120B uses a multiplexing bus in order to realize the switching operation. The transmission device 120B shown in FIG. 6 comprises line interfaces 141 and 142, a multiplexing bus 143, a control bus 144, a control part 145 and a speech codec 146. The line interface 141 couples the multiplexing bus 143 with the transmission path L1 carrying low-bit-rate signals, such as 16 Kbps signals, with each other. The line interface 142 couples the multiplexing bus 143 with the transmission path L2 carrying a multiplexed signal obtained by multiplexing low-bit-rate signals, such as 16 Kbps signals, with each other. Control information necessary for the switching operation is transferred between the line interfaces 141 and 142 and the controller 145 via the control bus 144. The multiplexing bus 143 multiplies real data, such as speech signals, with each other. The speech codec 146 has the function of converting 16 Kbps speech signals from the multiplexing bus 143 into a 64 Kbps speech signal and the function of converting a 64 Kbps speech signal from the signal line 134 into 16 Kbps speech signals, which are sent to the multiplexing bus 143. The control part 145 and the exchange 110B shown in FIG. 3 are connected to each other via the control line 133.

The operation of the transmission device shown in FIG. 6 will now be described. Normally, a signal from the transmission path L1 is coupled to the speech codec 146 using time slot #1 on the multiplexing bus 143 (hereinafter referred to as time slot TS1). A signal from the transmission path L2 is coupled to the speech codec 146 using time slot #2 (hereinafter referred to as time slot TS2). It will now be assumed that a call from the transmission path L1 terminates at the terminal T2 accommodated in the exchange 110B connected to the transmission device 120B. In this case, the control part 111 (FIG. 4) of the exchange 110B receives control information via the line interface 141, the control bus 144, the control part 145 and the control line 133, and thereby recognizes that there is a call which should terminate at the terminal T2. The control part 111 shown in FIG. 4 controls the switching part 112 so that the 64 Kbps speech signal received from the speech codec 146 via the signal line 134 is output to the terminal T2.

Meanwhile, when a call from the transmission line L1 should be relayed to the transmission path L2, the control part 111 of the exchange 110B receiving the control information via the above-mentioned route outputs the relay instruction to the control part 145 of the transmission device 120B. In response to the relay instruction, the control part 145 specifies a change in the time slot to be used (for example, use of time slot TS3 is specified) and informs the line interfaces 141 and 142 of this change. At this time, the connection with the speech codec 146 via the time slots TS1 and TS2 is released. In the above manner, it is possible to execute the relaying and switching operation by means of the multiplexing bus 143.

Figure 7:
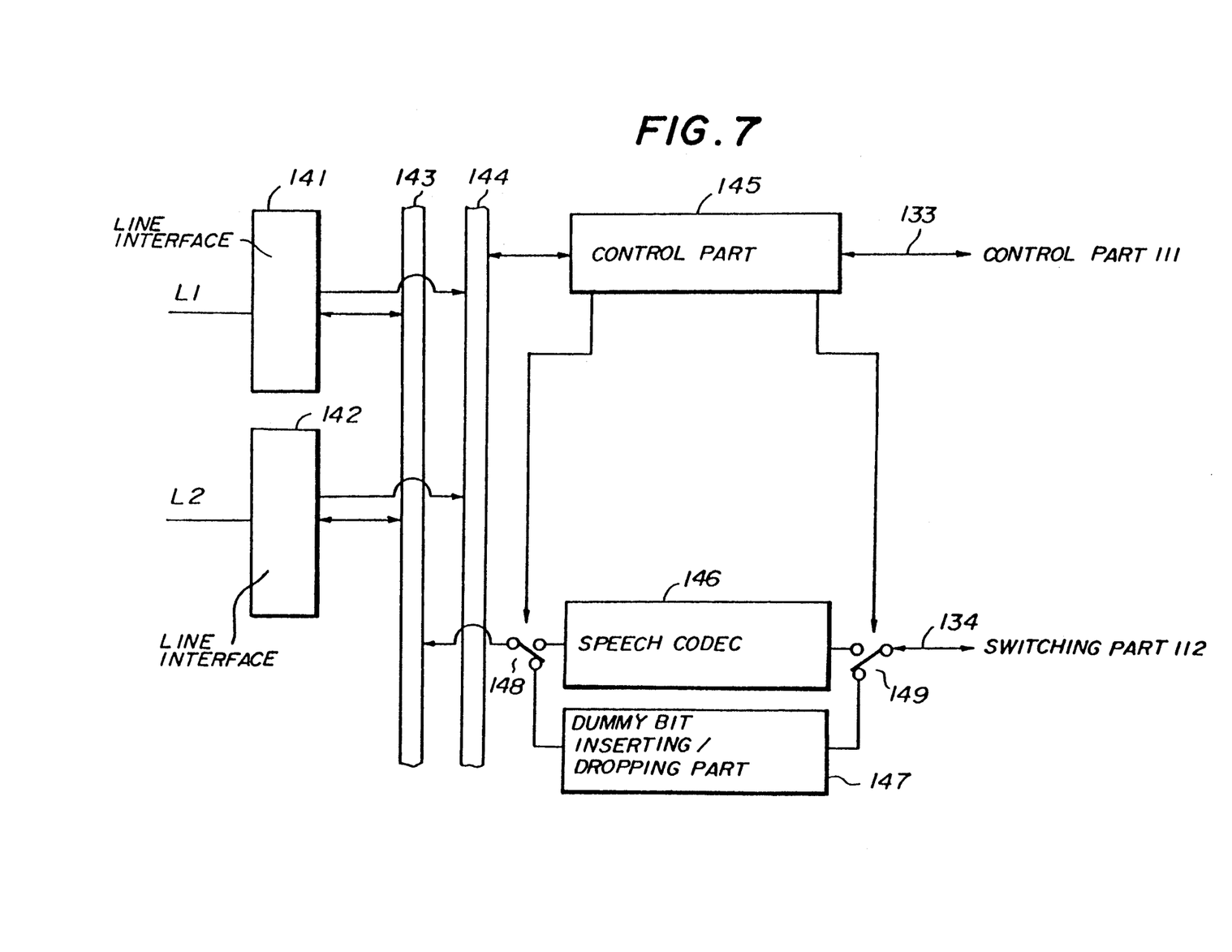
FIG. 7 is a block diagram of a transmission device in a communication device according to a second embodiment of the present invention.

A description will now be given of a second embodiment of the present invention with reference to FIG. 7. According to the second embodiment, the switching of a call to be relayed is carried out on the exchange 110B as in the case of the structure shown in FIG. 1. As has been described previously, the exchange 110B switches the 64 Kbps signals. In this regard, it is impossible to switch a call from the multiplexing bus 143 to be relayed. With the above in mind, as shown in FIG. 7, there are provided dummy bit inserting and dropping part 147 and two switches 148 and 149. The two switches 148 and 149 are controlled by the control part 145 in the following manner.

For example, when a call from the transmission path L1 should terminate at the terminal T2 accommodated by the exchange 110B, the line interface 141 and the switch 148 are connected to each other by using time slot TS1 on the multiplexing bus 143. At this time, the controller 145 of the exchange 110B can recognize that the call should terminate at a terminal accommodated by the exchange 110B. Then, the controller 145 controls the switch 148 so that the connection between the multiplexing bus 143 and the speech codec 146 is made, and controls the switch 149 so that the connection between the speech codec 146 and the signal line 134 is made. Thus the 16 Kbps speech signals using time slots TS1 on the multiplexing bus 143 is converted into the 64 Kbps speech signal by the speech codec 146. The 64 Kbps speech signal thus generated is output to the exchange 110B via the switch 149 and the signal line 134.

Meanwhile when a call from the transmission path L1 should be related to the transmission path L2, the control part 145 controls the switches 148 and 149 so that the dummy bit inserting and dropping part 147. The 16 Kbps signal from the multiplexing bus 143 is input to the dummy bit inserting and dropping part 147, which adds dummy bits equal to 48 Kbps to the 16 Kbps signal. In this manner, pseudo-speech signal is sent to the switching part 112 via the switch 149 and the signal line 134. In response to an instruction from the control part 111, the switching part 112 places the 64 Kbps pseudo-speech signal in a different time slot (for example, time slot TS4), and outputs it to the signal line 134. The control part 145 of the transmission device 120B is informed that the signal to be relayed is located in time slot TS4 by the control part of the exchange 110B. Then the control part 145 controls the switches 148 and 149 so that the dummy bit inserting and dropping part 147 is selected. The dummy bits equal to 48 Kbps are dropped from the 64 Kbps pseudo-speech signal by the dummy bit inserting and dropping part 147, and the remaining 16 Kbps speech signal is output of the multiplexing bus 143 via the switch 148. The line interface 142 receives, via time slot TS4, the 16 Kbps speech signal to be relayed and outputs it to the transmission path L2.

In the above manner different from the manner shown in FIG. 2, the transmission device 120B does not execute the 64 Kbps PCM converting operation on the signal to be relayed even in the case where the relay and switching operation. Hence, it becomes possible to prevent deterioration of the quality of speech. Since the second embodiment does not execute the relaying and switching operation in the transmission device 120B, a load of the transmission device 120B is smaller than that in the first embodiment.

The embodiments of the present invention have been described. The present invention is not limited to the communication system shown in FIG. 3.

INDUSTRIAL APPLICABILITY

The present invention is suitable for communication systems in which the relay and switching operation is executed using transmission paths having bit rates lower than or equal to 16 Kbps. Particularly, the present invention is suitable for small-size communication networks, such as a LAN and a VAN (Value Added Network).

We claim:

1. A communication device comprising:
   a transmission device connected to first and second transmission paths; and
   an exchange connected to said transmission device, wherein said exchange comprises:
   first control means for determining whether an input signal which has a first bit rate and is received by said transmission device via the first transmission path is a first signal, which is to be terminated at one of a plurality of terminals connected to said exchange, or a second signal, which is to be relayed to the second transmission path via said transmission device; and
   first switching means for selectively connected said transmission device and said plurality of terminals and transferring a signal having a second bit rate between them, and
   wherein said transmission device comprises:
   second switching means for selectively connecting said first and second transmission paths and said exchange and transferring a signal having the first bit rate between them;
   converting means for converting the input signal having the first bit rate into a signal having the second bit rate which is output to said exchange and for converting a signal which has the second bit rate and is received via said exchange into a signal having the first bit rate which is output to said second switching means; and
   second control means for controlling, when said first control means determines that the input signal is the first signal, said second switching means so that the input signal is output to said exchange via said converting means and for controlling, when said first control means determines that the input signal is the second signal, said second switching means so that the input signal is output to the second transmission path without changing a bit rate thereof.

2. A communication device as claimed in claim 1, wherein said second switching means of the transmission device comprises a time switch which exchanges time slots between the first and second transmission paths and said conversion means connected to said exchange.

3. A communication device as claimed in claim 1, wherein said second switching means of the transmission device comprises a multiplexing bus which exchanges time slots between the first and second transmission paths and said conversion means connected to said exchange.

4. A communication device as claimed in claim 1, wherein:
   said input signal comprises a speech signal; and
   said conversion means comprises codec means for converting a speech signal having the first bit rate into a speech signal having the second bit rate and for converting a speech signal having the second bit rate into a speech signal having the first bit rate.

5. A communication device as claimed in claim 1, wherein said first and second transmission paths comprises transmission paths which carry digital signals obtained by multiplexing speech signals having bit rates lower than or equal to 16 Kbps.

6. A communication device as claimed in claim 1, wherein:
   said transmission device comprises an interface circuit connected between the first and second transmission paths and said second switching means; and
   said first control means of said exchange determines whether the input signal is the first signal or the second signal on the basis of discrimination information contained in the input signal received via said interface circuit, said discrimination information indicating whether the input signal is to be terminated at one of the plurality of terminals or is to be relayed to the second transmission path.

7. A communication device as claimed in claim 1, wherein said first bit rate is lower than said second bit rate.

8. A communication device as claimed in claim 1, wherein said transmission device comprises multiplexing means for multiplexing a plurality of signals which respectively have the first bit rate and which are received via said conversion means and said first and second transmission paths to thereby output a multiplexed signal to said first and second transmission paths and for demultiplexing a multiplexed signal received via the first and second transmission paths into a plurality of signals respectively having the first bit rate and outputting these signals to said conversion means and said second switching means.

9. A communication device as claimed in claim 1, wherein said first and second transmission paths comprise digital lines.

10. A communication device comprising:
    a transmission device connected to first and second transmission paths; and
    an exchange connected to said transmission device, wherein said transmission device comprises:
    codec means for converting an input signal which has a first bit rate and is received via the first transmission path into a first converted input signal having a second bit rate and for converting an output signal which has the second bit rate and is received from said exchange into a first converted output signal having the first bit rate;
    dummy bit inserting and dropping means for adding dummy bits to said input signal so that a second converted input signal having the second bit rate is generated and for removing the dummy bits from a dummy-bit added output signal received from said exchange so that a second inverted output signal having the first bit rate is generated; and selecting means for selecting either said codec means or said dummy bit inserting and dropping means in accordance with a control signal, wherein said exchange comprises:

first control means for determining whether the input signal which has the first bit rate and is received by said transmission device via said first transmission path is a first signal which is to be terminated at one of a plurality of terminals connected to said exchange or a second signal which is to be relayed to said second transmission path; and switching means for selectively connecting said transmission device and said plurality of terminals to transfer signals respectively having the second bit rate, and wherein said transmission device comprises second control means for making said selecting means select said codec means when said first control means determines that said input signal is the first signal and for making said selecting means select said dummy bit inserting and dropping means when said first control means determines that said input signal is the second signal.

11. A communication device as claimed in claim 10, wherein said input signal comprises a speech signal.

12. A communication device as claimed in claim 10, wherein said first bit rate is lower than said second bit rate.

13. A communication device as claimed in claim 10, wherein said first and second transmission paths comprise transmission paths which transfer a digital signal obtained by multiplexing speech signals respectively having bit rates lower than or equal to 16 Kbps with each other.

14. A communication device as claimed in claim 10, wherein said transmission device comprises multiplexing means for multiplexing a plurality of signals which respectively have the first bit rate and which are received from said dummy bit inserting and dropping means and said codec means to thereby output a multiplexed signal to said first and second transmission paths and for demultiplexing a multiplexed signal received via the first and second transmission paths into a plurality of signals respectively having the first bit rate and outputting these signals to said codec means or said dummy bit inserting and dropping means.

* * * * *

UNITED STATES PATENT AND TRADEMARK OFFICE
CERTIFICATE OF CORRECTION

PATENT NO. : 5,301,190
DATED : April 5, 1994
INVENTOR(S) : Hiroyuki TSUKUDA et al.

It is certified that error appears in the above-indentified patent and that said Letters Patent is hereby corrected as shown below:

Column 3, line 22, after "20B" insert --(--.
        line 27, after ")" insert --(--.

Column 5, line 28, after "to" delete ".".

Column 8, line 54, after "," insert --a 64Kbsp--, and after "is" isnert --genterated. The 64 Kbps pseudo-speech signal is--.".

Signed and Sealed this

Thirtieth Day of August, 1994

Attest:

BRUCE LEHMAN

Attesting Officer     Commissioner of Patents and Trademarks